US012787103B2

(12) United States Patent
Dai et al.

(10) Patent No.: US 12,787,103 B2
(45) Date of Patent: Nov. 3, 2026

(54) METHODS AND APPARATUSES FOR DATA AND SIGNALING TRANSMISSION

(71) Applicant: LENOVO (BEIJING) LIMITED, Beijing (CN)

(72) Inventors: Mingzeng Dai, Shanghai (CN); Jie Shi, Beijing (CN); Ran Yue, Beijing (CN); Lianhai Wu, Beijing (CN); Jing Han, Beijing (CN); Haiming Wang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 206 days.

(21) Appl. No.: 18/291,425

(22) PCT Filed: Jul. 23, 2021

(86) PCT No.: PCT/CN2021/108188
§ 371 (c)(1),
(2) Date: Jan. 23, 2024

(87) PCT Pub. No.: WO2023/000315
PCT Pub. Date: Jan. 26, 2023

(65) Prior Publication Data
US 2024/0373497 A1 Nov. 7, 2024

(51) Int. Cl.
*H04W 76/27* (2018.01)
*H04W 28/02* (2009.01)

(52) U.S. Cl.
CPC ....... *H04W 76/27* (2018.02); *H04W 28/0273* (2013.01)

(58) Field of Classification Search
CPC .......................... H04W 76/27; H04W 28/0273
See application file for complete search history.

(56) References Cited

U.S. PATENT DOCUMENTS

2021/0410180 A1* 12/2021 Tsai ...................... H04L 1/1819
2022/0095410 A1* 3/2022 Shih ..................... H04B 7/0695
(Continued)

FOREIGN PATENT DOCUMENTS

EP 2832176 A1 * 2/2015
WO 2020200118 A1 10/2020
WO WO-2021231578 A1 * 11/2021 ............ H04W 72/23

OTHER PUBLICATIONS

Ericsson, "Baseline solution for small data transmission in RRC_ INACTIVE", 3GPP TSG-RAN WG2 #96 Tdoc R2-168713, Nov. 14-18, 2016, pp. 1-7.
(Continued)

*Primary Examiner* — Samina F Choudhry
(74) *Attorney, Agent, or Firm* — Kunzler Needham Hilton

(57) ABSTRACT

Embodiments of the present application relate to methods and apparatuses for data and signaling transmission. According to an embodiment of the present application, a method performed by a radio access network (RAN) node may include: receiving a radio resource control (RRC) resume request message associated with a small data transmission (SDT) from UE that is in a non RRC_CONNECTED state; and transmitting a RRC resume message to the UE, the RRC resume message for causing the UE to enter into RRC-CONNECTED state from the non RRC-CONNECTED state, in response to receiving at least one of the following: an indication associated with a downlink non-SDT transmission from another RAN node; downlink non-SDT data from a user plane function (UPF); and downlink non-SDT signaling from an access and mobility management function (AMF). Embodiments of the present application can enable more efficient notification of downlink non-SDT data and/or signalling arrival during a SDT procedure, such that the UE
(Continued)

can enter to RRC_CONNECTED with lower latency and signalling overhead.

17 Claims, 7 Drawing Sheets

(56) References Cited

U.S. PATENT DOCUMENTS

| | | | | |
|---|---|---|---|---|
| 2022/0132596 | A1* | 4/2022 | Jeon | H04W 74/002 |
| 2022/0408403 | A1* | 12/2022 | Tseng | H04W 76/27 |

OTHER PUBLICATIONS

Huawei, "pCR on Open issues for RRC inactive support in CU-DU to 38.473", 3GPP TSG RAN WG3 meeting #98 R3-174476, Nov. 27-Dec. 1, 2017, pp. 1-5.

PCT/CN2021/108188, "International Search Report and Written Opinion", International Searching Authority, Apr. 20, 2022, pp. 1-8.

OPPO, "Discussion on RACH-based SDT", 3GPP TSG-RAN WG2 Meeting #114 electronic R2-2104772, May 19-27, 2021, pp. 1-5.

Samsung, "Control Plane Common Aspects of RACH and CG based SDT", 3GPP TSG-RAN2 Meeting #114 Electronic R2-2104785, May 19-27, 2021, pp. 1-4.

Interdigital (Session Chair), "Report for Rel-17 Small data and URLLC/IIoT", 3GPP TSG-RAN WG2 Meeting #114 electronic R2-2106474, May 2021, pp. 1-13.

ZTE, "Discussion on SDT with/without UE context relocation", 3GPP TSG-RAN WG3 #111-e R3-210187, Jan. 25-Feb. 4, 2021, pp. 1-6.

ZTE, "Discussion on SDT with/without UE context relocation", 3GPP TSG-RAN WG3 #112-e R3-211570, May 17-28, 2021, pp. 1-5.

3GPP, "3rd Generation Partnership Project; Technical Specification Group Radio Access Network; NR; NR and NG-RAN Overall Description; Stage 2 (Release 16)", 3GPP TS 38.300 V16.6.0, Jun. 2021, pp. 1-152.

* cited by examiner

METHODS AND APPARATUSES FOR DATA AND SIGNALING TRANSMISSION

TECHNICAL FIELD

Embodiments of the present application generally relate to wireless communication technology, and especially to methods and apparatuses for data and signaling transmission, e.g., non-small data transmission (SDT) data and signaling transmission during a SDT procedure.

BACKGROUND

In 3GPP (3rd generation partnership project) 5G system, SDT is introduced for several application scenarios. For example, according to an agreement of 3GPP TSG radio access network (RAN) Meeting #86, a small data transmission can be used for smartphone applications including traffic from instant messaging services or used for non-smartphone applications including traffic from wearables. A small data transmission may also be named as a small data packet or the like. Generally, any device that has intermittent small data transmissions in a non-connected state, e.g., a radio resource control (RRC) inactive (i.e., RRC_INACTIVE) state or a RRC idle (i.e., RRC_IDLE) state will benefit from enabling small data transmission in the non-connected state.

During a SDT procedure, the downlink (DL) non-SDT data and/or DL non-SDT signaling may arrive at a base station (BS). In current technology, when the DL non-SDT data and/or signaling for a user equipment (UE) in the RRC_INACTIVE state arrives, a radio access network (RAN) paging procedure may be performed firstly. During the RAN paging procedure, the BS which receives the DL non-SDT data and/or signaling may send a RAN paging message to the cells in a RAN-based notification area (RNA). Then a new RRC resume procedure may be performed for changing the UE from the RRC_INACTIVE state to the RRC_CONNECTED state. However, such operations may cause large overhead and latency.

Given the above, the industry desires an improved technology for data and signaling transmission, so as to enable more efficient notification of downlink non-SDT data and/or signaling arrival during a SDT procedure, and accordingly the UE can enter into the RRC_CONNECTED state with lower latency and signaling overhead.

SUMMARY OF THE DISCLOSURE

Embodiments of the present application at least provide a technical solution for data and signaling transmission, especially for non-SDT data and signaling transmission during a SDT procedure.

According to some embodiments of the present application, a method performed by a RAN node may include: receiving a RRC resume request message associated with a SDT from UE that is in a non RRC_CONNECTED state; and transmitting a RRC resume message to the UE, the RRC resume message for causing the UE to enter into a RRC_CONNECTED state from the non RRC_CONNECTED state, in response to receiving at least one of the following: an indication associated with a downlink non-SDT transmission from another RAN node; downlink non-SDT data from a user plane function (UPF); and downlink non-SDT signaling from an access and mobility management function (AMF).

In some embodiments of the present application, receiving the downlink non-SDT data from the UPF includes receiving data of non-SDT quality of service (QoS) flow or data of non-SDT protocol data unit (PDU) session from the UPF during a SDT procedure, and the method further includes: receiving an indication indicating whether the PDU session or the QoS flow is subject to a SDT or non-SDT data transmission during an establishment procedure of the PDU session or an establishment procedure of the QoS flow.

In some embodiments of the present application, receiving the downlink non-SDT signaling from the AMF includes receiving a UE-associated signaling from the AMF during a SDT procedure.

In some embodiments of the present application, the method may further include: transmitting, to the other RAN node, a first retrieve UE context request message which includes a logical channel identity (LCID) of a logical channel via which the small data is transmitted in response to receiving the RRC resume request message associated with the SDT for at least a partial UE context retrieval; and receiving, from the other RAN node, a retrieve UE context failure message including the at least partial UE context in response to the first retrieve UE context request message.

In an embodiment of the present application, wherein the partial UE context includes a UE context for one or more SDT radio bearers (RBs) identified by the LCID.

In another embodiment of the present application, the partial UE context at least includes a radio link control (RLC) configuration of the one or more SDT RBs.

In some embodiments of the present application, the indication associated with the downlink non-SDT transmission from the other RAN node indicates at least one of arrival of the downlink non-SDT data and arrival of the downlink non-SDT signaling, and the method further includes: in response to receiving the indication, in response to receiving the indication, transmitting the RRC resume message to the UE to cause the UE to enter into the RRC_CONNECTED state for transmission of at least one of the downlink non-SDT data and the downlink non-SDT signaling.

In some embodiments of the present application, the indication associated with the downlink non-SDT transmission indicates the UE to enter into the RRC_CONNECTED state, and the method further includes: in response to receiving the indication, transmitting the RRC resume message to the UE to cause the UE to enter into the RRC_CONNECTED state for transmission of at least one of the downlink non-SDT data and the downlink non-SDT signaling.

In an embodiment of the present application, the method further includes: receiving the indication associated with the downlink non-SDT transmission in a message, wherein the message further includes at least one of: a full UE context; uplink (UL) transfer status for the SDT; and a DL data forwarding information.

In an embodiment of the present application, the method further includes: in response to receiving the indication associated with the downlink non-SDT transmission from the other RAN node, transmitting to the other RAN node a second retrieve UE context request message for retrieving a full UE context; and receiving, from the other RAN node, a retrieve UE context response message.

In some embodiments of the present application, the indication associated with the non-SDT transmission is a RAN paging message including an identity of the UE, and the method further includes: determining whether there is an ongoing SDT procedure for the UE; and in the case that there is the ongoing SDT procedure for the UE, transmitting the RRC resume message to cause the UE to enter into a RRC_CONNECTED state for transmission of at least one of the downlink non-SDT data and the downlink non-SDT signaling.

In an embodiment of the present application, the method further includes: in response to receiving the RRC resume request message from the UE, transmitting to the other RAN node a retrieve UE context request message, which includes a LCID of a logical channel via which the small data is transmitted; and receiving a retrieve UE context response message from the other RAN node, wherein the retrieve UE context response message includes the indication associated with the downlink non-SDT transmission.

In some embodiments of the present application, the method further includes: in response to receiving the RRC resume request message from the UE, transmitting to the other RAN node a retrieve UE context request message, which includes a LCID of a logical channel via which the small data is transmitted; and receiving from the other RAN node a retrieve UE context response message, wherein the retrieve UE context response message includes a full UE context.

In some embodiments of the present application, the method is performed by a central unit control plane (CU-CP) of a base station, and wherein the indication associated with the downlink non-SDT transmission is received from a central unit user plane (CU-UP) of the base station.

According to some embodiments of the present application, a method performed by a RAN node, may include: receiving, from another RAN node, a first retrieve UE context request message associated with a small data transmission (SDT) of a user equipment that is in a non RRC_CONNECTED state; and in response to at least one of arrival of downlink non-SDT data and arrival of downlink non-SDT signaling, transmitting an indication associated with a downlink non-SDT transmission to the other RAN node.

In some embodiments of the present application, the arrival of downlink non-SDT data includes receiving data of non-SDT QoS flow or data of non-SDT PDU session from a UPF during a SDT procedure, and the method further includes: receiving, an indication indicating whether the PDU session or the QoS flow is subject to an SDT or non-SDT data transmission during an establishment procedure of the PDU session or the QoS flow.

In some embodiments of the present application, the arrival of the downlink non-SDT signaling includes receiving a UE-associated signaling from an AMF during a SDT procedure.

In an embodiment of the present application, the first retrieve UE context request message includes a LCID of a logical channel via which the small data is transmitted.

In an embodiment of the present application, the method further includes: determining that an anchor relocation is not needed for the SDT; and transmitting, to the other RAN node, a retrieve UE context failure message including at least a partial UE context in response to the first retrieve UE context request message.

In an embodiment of the present application, wherein the partial UE context includes a UE context for one or more SDT RBs identified by the LCID.

In another embodiment of the present application, the partial UE context at least includes a RLC configuration of the one or more SDT RBs.

In some embodiments of the present application, the indication associated with the downlink non-SDT transmission indicates at least one of arrival of the downlink non-SDT data and arrival of the downlink non-SDT signaling.

In some embodiments of the present application, the indication associated with the downlink non-SDT transmission indicates the UE to enter into a RRC_CONNECTED state.

In an embodiment of the present application, the method further includes: transmitting, to the other RAN node, the indication associated with the downlink non-SDT transmission in a message, wherein the message further includes at least one of: a full UE context; UL transfer status for the SDT; and DL data forwarding information.

In some embodiments of the present application, the method further includes: receiving, from the other RAN node, a second retrieve UE context request message after transmitting the indication associated with the downlink non-SDT transmission for retrieving a full UE context; and transmitting, to the other RAN node, a retrieve UE context response message in response to the second retrieve UE context request message.

In some embodiments of the present application, the indication associated with the downlink non-SDT transmission is a RAN paging message including an identity of the UE.

In an embodiment of the present application, the method further includes: in response to receiving the first retrieve UE context request message from the other RAN node and at least one of arrival of downlink non-SDT data and arrival of downlink non-SDT signaling, determining that an anchor relocation is needed for the SDT; and transmitting, to the other RAN node, a retrieve UE context response message in response to the first retrieve UE context request message, wherein the retrieve UE context response message comprises the indication associated with the downlink non-SDT transmission.

In some embodiments of the present application, the method may further include: in response to at least one of arrival of downlink non-SDT data and arrival of downlink non-SDT signaling, transmitting a RRC release message with the indication.

In an embodiment of the present application, the RRC release message may include another indication indicating at least one of arrival of downlink non-SDT data and arrival of downlink non-SDT signaling.

According to some embodiments of the present application, a method performed by a UE may include: initializing a SDT procedure for a SDT; and monitoring a RAN paging message from a RAN node after initializing the SDT procedure.

In some embodiments of the present application, the method further includes: in response to receiving the RAN message, transmitting an indication indicating arrival of non-SDT data to the RAN node.

In some embodiments of the present application, the method further includes: starting a timer in response to receiving the RAN paging message; in the case that no RRC resume message is received when the timer running, initializing a RRC resume procedure after the timer expires; and in the case that a RRC release message or a RRC reject message is received when the timer running, initializing a RRC resume procedure and stopping the timer.

In some embodiments of the present application, the method may further include: stop monitoring the RAN paging message in case of the SDT procedure is successful.

In an embodiment of the present application, the SDT procedure being successful includes one of: a random access channel (RACH) procedure is performed successfully in case of the SDT is a RACH based SDT; a first packet is transmitted successfully to the RAN node; and a RRC resume request message is transmitted successfully to the RAN node.

According to some embodiments of the present application, a method performed by a RAN node may include: receiving a RRC resume request message associated with a SDT from a UE that is in a non RRC_CONNECTED state; receiving a RRC release message with an indication associated with a downlink non-SDT transmission from another RAN node; and transmitting the RRC release message to the UE.

Some embodiments of the present application also provide a RAN node, including: a processor; and a transceiver coupled to the processor, wherein the processor is configured to receive a RRC resume request message associated with a SDT from a UE that is in a non RRC_CONNECTED state; and to transmit a RRC resume message to the UE, the RRC resume message for causing the UE to enter into a RRC_CONNECTED state from the non RRC_CONNECTED state, in response to receiving at least one of the following: an indication associated with a downlink non-SDT transmission from another RAN node; downlink non-SDT data from a UPF; and downlink non-SDT signaling from an AMF.

Some other embodiments of the present application also provide a RAN node, including: a processor; and a transceiver coupled to the processor, wherein the processor is configured to receive from another RAN node, a first retrieve UE context request message associated with a SDT of a user equipment that is in a non RRC_CONNECTED state; and to transmit an indication associated with a downlink non-SDT transmission to the other RAN node in response to at least one of arrival of downlink non-SDT data and arrival of downlink non-SDT signaling.

Some other embodiments of the present application also provide a RAN node, including: a processor; and a transceiver coupled to the processor, wherein the processor is configured to receive a RRC resume request message associated with a SDT from a UE that is in a non RRC_CONNECTED state; receive a RRC release message with an indication associated with a downlink non-SDT transmission from another RAN node; and transmit the RRC release message to the UE.

Some other embodiments of the present application also provide a UE, including: a processor; and a transceiver coupled to the processor, wherein the processor is configured to initialize a SDT procedure for a SDT; and to monitor a RAN paging message after initializing the SDT procedure.

Embodiments of the present application provide a technical solution for data and signaling transmission, which can efficiently notify the arrival of downlink non-SDT data and/or signaling during a SDT procedure, and reduce latency and signaling overhead for entering the UE into a connected state, e.g., the RRC_CONNECTED state.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of the currently preferred embodiments of the present application and is not intended to represent the only form in which the present application may be practiced. It is to be understood that the same or equivalent functions may be accomplished by different embodiments that are intended to be encompassed within the spirit and scope of the present application.

Reference will now be made in detail to some embodiments of the present application, examples of which are illustrated in the accompanying drawings. To facilitate understanding, embodiments are provided under specific network architecture and new service scenarios, such as 3GPP 5G (i.e., new radio (NR)), 3GPP long term evolution (LTE) Release 8 and so on. Persons skilled in the art know very well that, with the development of network architecture and new service scenarios, the embodiments in the present application are also applicable to similar technical problems; and moreover, the terminologies recited in the present application may change, which should not affect the principle of the present application.

Figure 1:
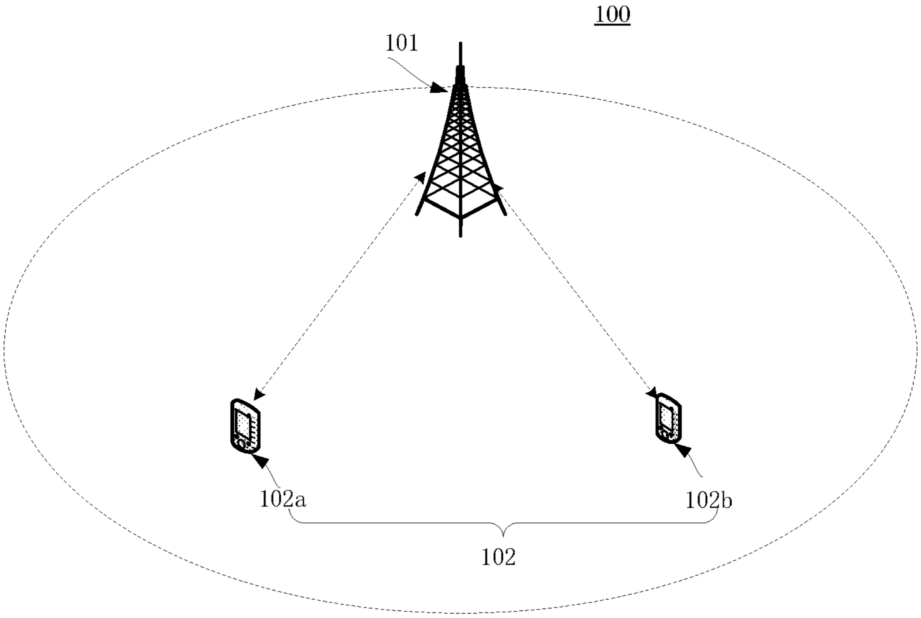
FIG. 1 is a schematic diagram illustrating an exemplary wireless communication system according to some embodiments of the present application.

FIG. 1 is a schematic diagram illustrating an exemplary wireless communication system 100 according to some embodiments of the present application.

As shown in FIG. 1, the wireless communication system 100 includes at least one base station (BS) 101 and at least one UE 102. In particular, the wireless communication system 100 includes one BS 101 and two UEs 102 (e.g., a UE 102*a* and a UE 102*b*) for illustrative purpose. Although a specific number of BS 101 and UEs 102 are depicted in FIG. 1, it is contemplated that any number of BSs 101 and UEs 102 may be included in the wireless communication system 100.

The wireless communication system 100 is compatible with any type of network that is capable of sending and receiving wireless communication signals. For example, the wireless communication system 100 is compatible with a wireless communication network, a cellular telephone network, a time division multiple access (TDMA)-based network, a code division multiple access (CDMA)-based network, an orthogonal frequency division multiple access (OFDMA)-based network, an LTE network, a 3GPP-based network, a 3GPP 5G network, a satellite communications network, a high altitude platform network, and/or other communications networks.

The BS 101 may also be referred to as a NG-RAN node, a RAN node, an access point, an access terminal, a base, a macro cell, a node-B, an enhanced node B (eNB), a gNB, a home node-B, a relay node, or a device, or described using other terminology used in the art. The BS 101 is generally part of a radio access network that may include a controller communicably coupled to the BS 101.

According to some embodiments of the present application, the UE(s) 102 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like.

According to some other embodiments of the present application, the UE(s) 102 may include a portable wireless communication device, a smart phone, a cellular telephone, a flip phone, a device having a subscriber identity module, a personal computer, a selective call receiver, or any other device that is capable of sending and receiving communication signals on a wireless network.

According to some other embodiments of the present application, the UE(s) 102 may include wearable devices, such as smart watches, fitness bands, optical head-mounted displays, or the like.

Moreover, the UE(s) 102 may be referred to as a subscriber unit, a mobile, a mobile station, a user, a terminal, a mobile terminal, a wireless terminal, a fixed terminal, a subscriber station, a user terminal, or a device, or described using other terminology used in the art.

Both the UE 102*a* and the UE 102*b* in the embodiments of FIG. 1 may transmit information to the BS 101 and receive control information from the BS 101, for example, via LTE or new radio (NR) Uu interface.

NR supports a RRC_INACTIVE state. However, until Rel-16, the RRC_INACTIVE state does not support data transmission. Hence, in the case that the UE in the RRC_INACTIVE state has data to be transmitted, it has to resume the connection (i.e. move to the RRC_CONNECTED state) for any downlink and uplink data transmission. The RRC connection setup and subsequently release to the RRC_INACTIVE state happen for each data transmission, which results in unnecessary power consumption and signaling overhead.

To enable the data transmission in the RRC_INACTIVE state, a work item in the NR states that small data transmission in the RRC_INACTIVE state may be implemented through a RACH-based scheme (e.g., 2-step RACH scheme or 4-step RACH scheme as specified in 3GPP standard documents), or through the pre-configured physical uplink shared channel (PUSCH) resources (e.g. reusing the configured grant (CG) type 1 as specified in 3GPP standard documents), without changing the RRC state of the UE to the RRC_CONNECTED state. For example, the small data may be transmitted using MsgA in the 2-step RACH scheme or Msg3 in the 4-step RACH scheme.

The small data may include small and infrequent data traffic. Specific examples of small and infrequent data traffic include the following use cases: 1) smartphone applications; and 2) non-smartphone applications. The smartphone applications may include traffic from instant messaging services (whatsapp, QQ, wechat, etc.); heart-beat/keep-alive traffic from instant messaging (IM)/email clients and other apps; and push notifications from various applications. The non-smartphone applications may include traffic from wearables (e.g., periodic positioning information, etc.), sensors (e.g., industrial wireless sensor networks transmitting temperature, pressure readings periodically or in an event triggered manner, etc.), and smart meters and smart meter networks sending periodic meter readings. Persons skilled in the art can understand that the above use cases are only for illustrative purposes. According to some other embodiments, the same data may include the data in other use cases with small amount and infrequent transmission.

Dependent on whether to support the small data transmission, there are two types of RB(s) in the RRC_INACTIVE state, i.e., SDT RB(s) which supports the small data transmission in the RRC_INACTIVE state and non-SDT RB(s) which does not support small data transmission in the RRC_INACTIVE state.

It is agreed by RAN2 that only SDT RB(s) are resumed for SDT initialization (i.e., before sending a RRC resume request message), i.e., upon initiating a RRC resume procedure for the SDT initiation (i.e. for the first SDT), the UE may reestablish at least the SDT packet data convergence protocol (PDCP) entities and resume the SDT DRBs that are configured for small data transmission and SDT signaling radio bearer (SRB).

In RAN2 #113bis-e meeting, RAN2 further agreed that the non-SDT RB(s) are only resumed upon receiving a RRC resume message. In addition, RAN2 also discussed the methods for the UE to indicate the network about the uplink (UL) data arrival for non-SDT RBs during the SDT procedure. There are two solutions for indicating the UL data arrival by the UE, i.e., indicating the data arrival of non-SDT RBs by dedicated control channel (DCCH) or by common control channel (CCCH).

The above solutions are for indicating the UL data arrival during the SDT procedure. However, there is another case that the DL non-SDT data and/or signaling may arrive at a BS during the SDT procedure, which has not been discussed by RAN2 yet. In current technology, when the DL non-SDT data and/or signaling for a UE in the RRC_INACTIVE state arrives, a RAN paging procedure may be performed as specified in TS 38.300, e.g., if the last serving gNB receives DL data from the UPF or DL UE-associated signaling from the AMF (except for the UE Context Release Command message) while the UE is in the RRC_INACTIVE state, the last serving gNB will page in the cells corresponding to the RNA and send a RAN paging message to neighbour gNB(s) if the RNA includes cells of neighbour gNB(s). Then, a new RRC resume procedure may be performed for moving the UE from the RRC_INACTIVE state to the RRC_CONNECTED state. However, sending the RAN paging message among cells in the RAN followed by a new RRC resume procedure may cause large overhead and latency.

Given the above, embodiments of the present application provide a technical solution for data and signaling transmission, which can enable efficient notification of downlink non-SDT data and/or signaling arrival during a SDT procedure, such that the UE can enter into a connected state, e.g., the RRC_CONNECTED state with lower latency and lower signaling overhead compared with the current technology. More details on embodiments of the present application will be illustrated in the following text in combination with the appended drawings.

Figure 2:
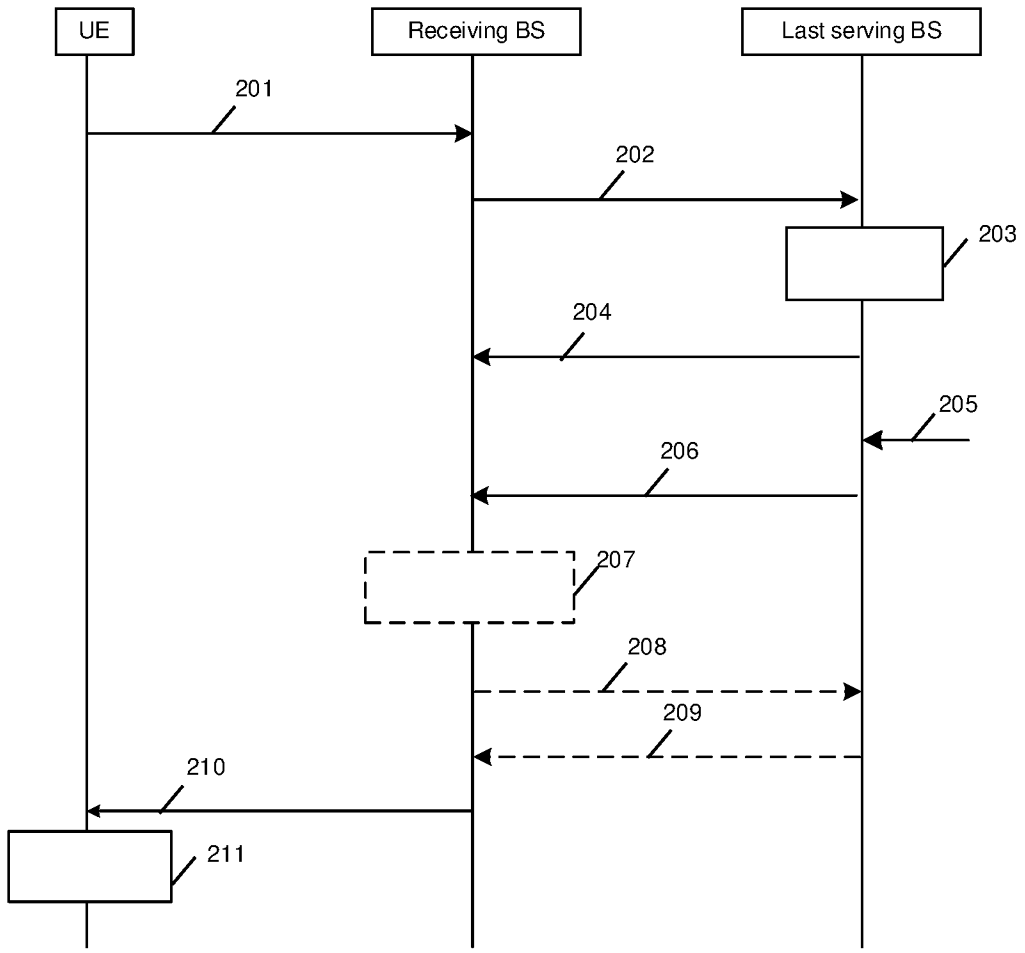
FIG. 2 illustrates an exemplary flowchart of a method for data and signaling transmission according to some embodiments of the present application.

FIG. 2 illustrates an exemplary flowchart of a method for data and signaling transmission according to some embodiments of the present application. Although the method is illustrated in a system level by a UE (e.g., UE 102*a* or UE 102*b* in FIG. 1), a receiving BS (e.g., BS 101), and a last serving BS (not shown in FIG. 1), persons skilled in the art can understand that the method implemented in the UE, the method implemented in the receiving BS, and the method implemented in the last severing BS can be separately implemented and incorporated in other apparatus with the like functions. The receiving BS may be a serving BS of the UE. The last serving BS may also be referred to as an anchor BS which keeps the UE context of the UE. In the embodiments of FIG. 2, the UE may be in a non RRC_CONNECTED state (e.g., a RRC_IDLE state or a RRC_INACTIVE state). Each of the receiving BS and the last serving BS may be referred to as a RAN node.

In the exemplary embodiments shown in FIG. 2, in the case that the UE has small data to be transmitted, the UE may initiate a SDT procedure. The SDT procedure may include transmitting a RRC resume request message associated with a SDT to the receiving BS in step 201. In some embodiments of the present application, the RRC resume request message may be transmitted together with the small data. The RRC resume request message (together with the small data in some embodiments) may be transmitted through a RACH-based scheme (e.g., 2-step RACH scheme or 4-step RACH scheme as specified in 3GPP standard documents), or through the pre-configured PUSCH resources as specified in 3GPP standard documents.

After receiving the RRC resume request message associated with the SDT, the receiving BS may resolve an ID of the last serving BS contained in the inactivate radio network temporary identifier (I-RNTI) included in the RRC resume request message. Then, in step 202, in response to receiving the RRC resume request message associated with the SDT, the receiving BS may transmit a first retrieve UE context request message to the last serving BS for at least a partial UE context retrieval from the last serving BS. The first retrieve UE context request message may include a LCID of a logical channel via which the small data is transmitted so that the last serving BS can identify which RB(s) the small data belongs to.

After receiving the first retrieve UE context request message, in step 203, the last serving BS may decide that anchor relocation is not needed for the SDT. Then, in step 204, the last serving BS may transmit a retrieve UE context failure message in response to the first retrieve UE context request message to the receiving BS. The retrieve UE context failure message may include the at least partial UE context of the UE. The retrieve UE context failure message is an example. It is also possible that other messages can be used instead of the retrieve UE context failure message.

In some embodiments of the present application, the partial UE context may include a UE context for one or more SDT RBs identified by the LCID. In an embodiment of the present application, the partial UE context at least includes a RLC configuration of the one or more SDT RBs.

In step 205, at least one of the downlink non-SDT data from the UPF and downlink non-SDT signaling from the AMF for the UE may arrive at the last serving BS. That is, the last serving BS may receive at least one of the downlink non-SDT data from the UPF and downlink non-SDT signaling from the AMF. Since there is no downlink SDT signaling, the downlink non-SDT signaling is equivalent to downlink signaling, which means that it does not need to distinguish the SDT signaling and non-SDT signaling.

In some embodiments of the present application, the arrival of downlink non-SDT data (i.e., receiving the downlink non-SDT data) from the UPF includes receiving data of non-SDT quality of QoS flow or data of non-SDT PDU session from the UPF during the SDT procedure. In such embodiments, the last serving BS may also receive an indication indicating whether the PDU session or the QoS flow is subject to a SDT or non-SDT data transmission during an establishment procedure of the PDU session or an establishment procedure of the QoS flow.

In some embodiments of the present application, the arrival of the downlink non-SDT signaling (i.e., receiving the downlink non-SDT signaling) from the AMF may include receiving a UE-associated signaling from the AMF during a SDT procedure.

Then, in step 206, in response to at least one of arrival of downlink non-SDT data and arrival of downlink non-SDT signaling, the last serving BS may transmit an indication associated with a downlink non-SDT transmission to the receiving BS.

In some embodiments of the present application, the indication associated with the downlink non-SDT transmission may indicate at least one of arrival of the downlink non-SDT data and arrival of the downlink non-SDT signaling. For example, the indication may be a DL non-SDT data/signaling arrival indication. After receiving the indication, in step 207, the receiving BS may determine whether to indicate the UE to enter into the RRC_CONNECTED state for transmission of the downlink non-SDT data or the downlink non-SDT signaling. If the receiving BS determines to indicate the UE to enter into the RRC_CONNECTED state, in step 210, the receiving BS may transmit a RRC resume message to the UE for causing the UE to enter into the RRC_CONNECTED state. Then, after receiving the RRC resume message, in step 211, the UE may enter into the RRC_CONNECTED state for receiving the downlink non-SDT data and/or the downlink non-SDT signaling. For example, the UE may resume all non-SDT RBs of at least one of the downlink non-SDT data and the downlink non-SDT signaling.

In some other embodiments of the present application, when the last serving BS receives at least one of: DL data of non-SDT PDU session or non-SDT QoS flow from the UPF and DL UE-associated signaling from the AMF, the last serving BS may decide to move the UE into the RRC_CONNECTED state. In such embodiments, the indication associated with the downlink non-SDT transmission transmitted from the last serving BS to the receiving BS may indicate the UE to enter into the RRC_CONNECTED state. For example, the indication may be a "RRC_CONNECTED state suggested" indication, or "RRC_CONNECTED required" indication or a similar indication. After receiving such an indication, the receiving BS will not perform step 207, but directly transmit a RRC resume message to the UE for causing the UE to enter into the RRC_CONNECTED state in step 210. Then, after receiving the RRC resume message, in step 211, the UE may enter into the RRC_CONNECTED state for receiving the downlink non-SDT data and/or the downlink non-SDT signaling. For example, the UE may resume all non-SDT RBs of the downlink non-SDT data and/or the downlink non-SDT signaling.

In some embodiments of the present application, the indication associated with the downlink non-SDT transmission may be transmitted in a message (e.g., a new Xn message). In an embodiment of the present application, in addition to the indication, the message may also include at least one of: a full UE context of the UE, UL transfer status for the SDT, and a DL data forwarding information. The full UE context may include all the UE context of the UE, for example, the UE context for SDT RB(s) and the UE context for the non-SDT RB(s). The UL transfer status for the SDT may include a receiving status of PDCP service data unit (SDU) of the SDT RB(s). The DL data forwarding information may indicate that there is downlink non-SDT data needed to be forwarded to the receiving BS, such that the receiving BS may provide a data forwarding information such as internet protocol (IP) address and general packet radio service (GPRS) tunnel protocol user plane (GTP-U) tunnel endpoint identifier (TEID) to the last serving BS.

In some other embodiments, the last serving BS may not provide the full UE context together with the indication. In such embodiments, in response to receiving the indication associated with the downlink non-SDT transmission, in step 208, the receiving BS may transmit a second retrieve UE context request message for retrieving a full UE context of the UE. After receiving the second retrieve UE context request message, in step 209, the last serving BS may transmit a retrieve UE context response message to the receiving BS. The retrieve UE context response message may include the full UE context of the UE. Step 208 may be performed before, simultaneously with, or after step 207. After step 209, step 210 and step 211 are performed.

Figure 3:
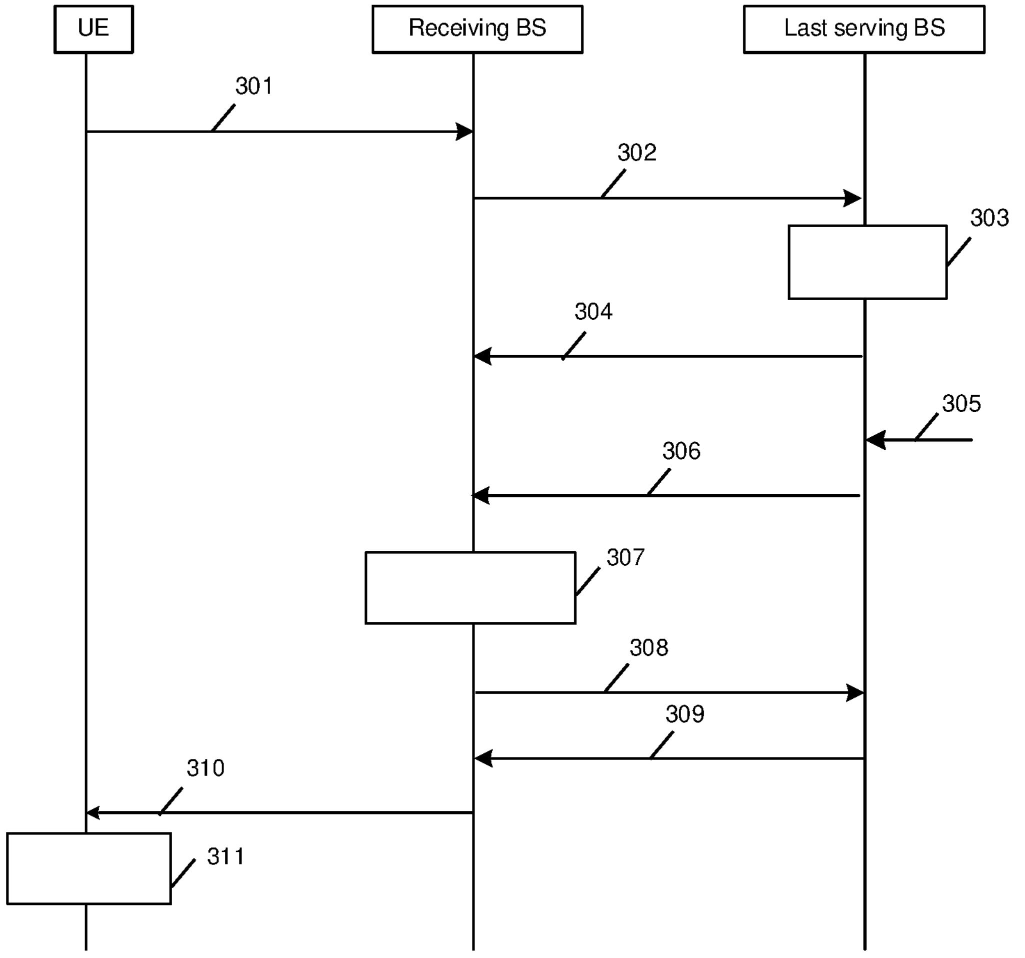
FIG. 3 illustrates another exemplary flowchart of a method for data and signaling transmission according to some other embodiments of the present application.

FIG. 3 illustrates another exemplary flowchart of a method for data and signaling transmission according to some other embodiments of the present application. Although the method is illustrated in a system level by a UE (e.g., UE 102*a* or UE 102*b* in FIG. 1), a receiving BS (e.g., BS 101), and a last serving BS (not shown in FIG. 1), persons skilled in the art can understand that the method implemented in the UE, the method implemented in the receiving BS, and the method implemented in the last severing BS can be separately implemented and incorporated in other apparatus with the like functions. The receiving BS may be a serving BS of the UE. The last serving BS may also be referred to as an anchor BS which keeps the UE context of the UE. In the embodiments of FIG. 3, the UE may be in a non RRC_CONNECTED state (e.g., a RRC_IDLE state or a RRC_INACTIVE state). Each of the receiving BS and the last serving BS may be referred to as a RAN node.

In the exemplary method shown in FIG. 3, steps 301-305 may the same as steps 201-205 in FIG. 2, respectively.

In step 306, the last serving BS may also transmit the indication associated with the downlink non-SDT transmission in response to at least one of arrival of downlink non-SDT data from the UPF and arrival of downlink non-SDT signaling from the AMF. Different from step 206, the indication associated with the downlink non-SDT transmission in step 306 may be a RAN paging message including an ID of the UE. In an embodiment of the present application, the ID of the UE may be I-RNTI.

After receiving the RAN paging message, in step 307, the receiving BS may determine whether there is an ongoing SDT procedure for the UE with the ID included in the RAN paging message. In the case that there is an ongoing SDT procedure for the UE, in step 310, the receiving BS may transmit the RRC resume message to indicate the UE to enter into the RRC_CONNECTED state for transmission of the downlink non-SDT data and/or the downlink non-SDT signaling without performing a RAN paging procedure. If there is no ongoing SDT procedure or the SDT procedure has been finished for the UE with the ID included in the RAN paging message, the receiving BS may perform a RAN paging procedure.

Then, after receiving the RRC resume message, in step 311, the UE may enter into the RRC_CONNECTED state for receiving the downlink non-SDT data and/or the downlink non-SDT signaling. For example, the UE may resume all non-SDT RBs of the downlink non-SDT data and/or the downlink non-SDT signaling.

After receiving the RAN paging message and before transmitting the RRC resume message to the UE, in step 308, the receiving BS may transmit a second retrieve UE context request message for retrieving a full UE context of the UE. After receiving the second retrieve UE context request message, in step 308, the last serving BS may transmit a retrieve UE context response message to the receiving BS. The retrieve UE context response message may include the full UE context of the UE.

Figure 4:
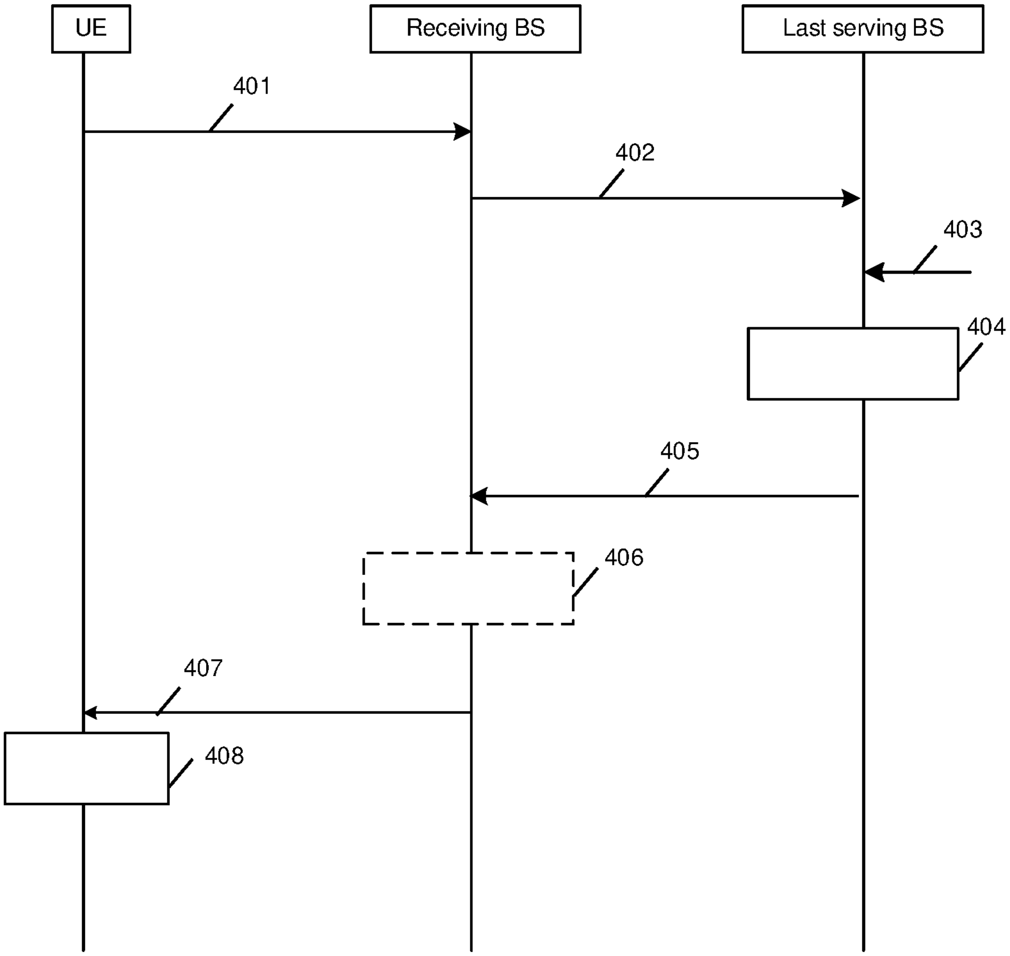
FIG. 4 illustrates yet another exemplary flowchart of a method for data and signaling transmission according to some other embodiments of the present application.

FIG. 4 illustrates an exemplary flowchart of a method for data and signaling transmission according to some embodiments of the present application. Although the method is illustrated in a system level by a UE (e.g., UE 102*a* or UE 102*b* in FIG. 1), a receiving BS (e.g., BS 101), and a last serving BS (not shown in FIG. 1), persons skilled in the art can understand that the method implemented in the UE, the method implemented in the receiving BS, and the method implemented in the last severing BS can be separately implemented and incorporated in other apparatus with the like functions. The receiving BS may be a serving BS of the UE. The last serving BS may also be referred to as an anchor BS which keeps the UE context of the UE. In the embodiments of FIG. 4, the UE may be in a non RRC_CONNECTED state (e.g., a RRC_IDLE state or a RRC_INACTIVE state). Each of the receiving BS and the last serving BS may be referred to as a RAN node.

In the exemplary method shown in FIG. 4, steps 401-402 may be the same as steps 201-202 in FIG. 2.

In step 403, at least one of the downlink non-SDT data from the UPF and downlink non-SDT signaling from the AMF for the UE may arrive at the last serving BS. That is, the last serving BS may receive at least one of the downlink non-SDT data from the UPF and downlink non-SDT signaling from the AMF.

In some embodiments of the present application, the arrival of downlink non-SDT data (i.e., receiving the downlink non-SDT data) from the UPF includes receiving data of non-SDT quality of QoS flow or data of non-SDT PDU session from the UPF during the SDT procedure. In such embodiments, the last serving BS may also receive an indication indicating whether the PDU session or the QoS flow is subject to a SDT or non-SDT data transmission during an establishment procedure of the PDU session or an establishment procedure of the QoS flow.

In some embodiments of the present application, the arrival of the downlink non-SDT signaling (i.e., receiving the downlink non-SDT signaling) from the AMF may include receiving a UE-associated signaling from the AMF during a SDT procedure.

The step 403 may be performed before, after, or simultaneously with step 402.

In response to receiving the first retrieve UE context request message and at least one of arrival of downlink non-SDT data and arrival of downlink non-SDT signaling, in step 404, the last serving BS may determine that an anchor relocation is needed for the SDT. Then, in step 405, the last serving BS may transmit a retrieve UE context response message in response to the first retrieve UE context request message. The retrieve UE context response message may include the indication associated with the downlink non-SDT transmission. In some embodiments of the present application, the retrieve UE context response message may also include a full UE context of the UE.

In some embodiments of the present application, the indication associated with the downlink non-SDT transmission may indicate at least one of arrival of the downlink non-SDT data and arrival of the downlink non-SDT signaling. For example, the indication may be a DL non-SDT data/signaling arrival indication. After receiving the indication, in step 406, the receiving BS may determine whether to indicate the UE to enter into the RRC_CONNECTED state for transmission of the downlink non-SDT data and/or the downlink non-SDT signaling. If the receiving BS determines to indicate the UE to enter into the RRC_CONNECTED state, in step 407, the receiving BS may transmit a RRC resume message to the UE for causing the UE to enter into the RRC_CONNECTED state. If the UE is already sent to the RRC_INACTIVE state, the receiving BS may send a RAN paging message to the UE. Then, after receiving the RRC resume message, in step 408, the UE may enter into the RRC_CONNECTED state for receiving the downlink non-SDT data and/or the downlink non-SDT signaling. For example, the UE may resume all non-SDT RBs of the downlink non-SDT data and/or the downlink non-SDT signaling.

In some other embodiments of the present application, when the last serving BS receives at least one of: DL data of non-SDT PDU session or non-SDT QoS flow from the UPF and DL UE-associated signaling from the AMF, the last serving BS may decide to move the UE into the RRC_CONNECTED state. In such embodiments, the indication associated with the downlink non-SDT transmission transmitted from the last serving BS to the receiving BS may indicate the UE to enter into the RRC_CONNECTED state. For example, the indication may be a "RRC_CONNECTED state suggested" indication, or "RRC_CONNECTED required" indication or such kind of indication. After receiving the indication, the receiving BS does not perform step 406, but directly transmit a RRC resume message to the UE for causing the UE to enter into the RRC_CONNECTED state in step 407. Then, after receiving the RRC resume message, in step 408, the UE may enter into the RRC_CONNECTED state for receiving the downlink non-SDT data and/or the downlink non-SDT signaling. For example, the UE may resume all non-SDT RBs of the downlink non-SDT data and/or the downlink non-SDT signaling.

Figure 5:
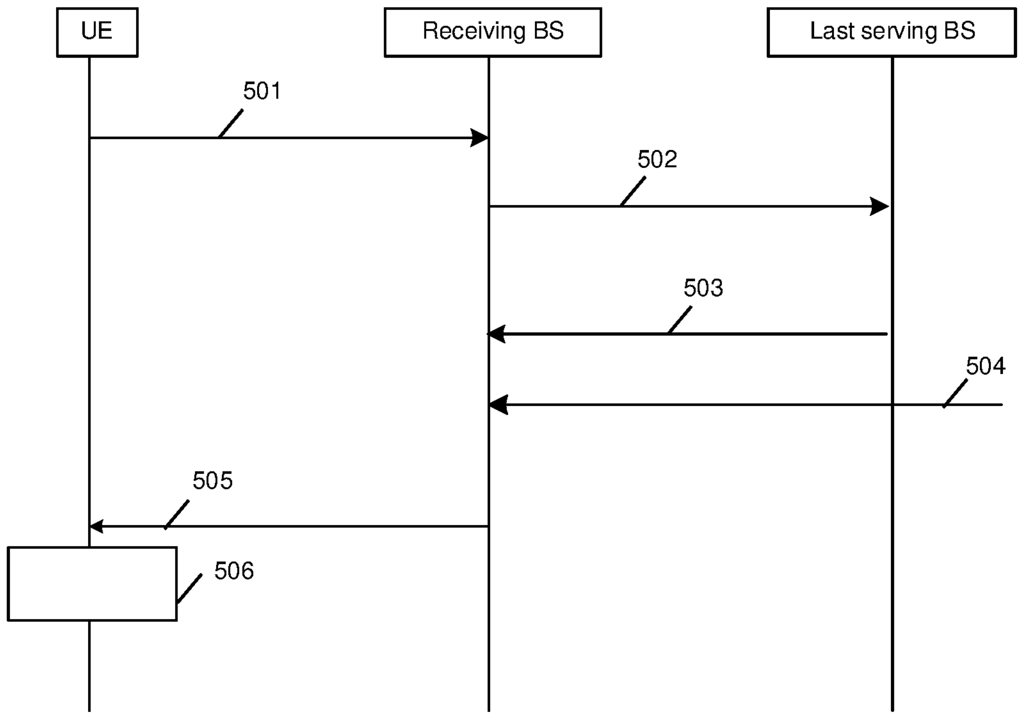
FIG. 5 illustrates yet another exemplary flowchart of a method for data and signaling transmission according to some other embodiments of the present application.

FIG. 5 illustrates yet another exemplary flowchart of a method for data and signaling transmission according to some embodiments of the present application. Although the method is illustrated in a system level by a UE (e.g., UE 102*a* or UE 102*b* in FIG. 1), a receiving BS (e.g., BS 101), and a last serving BS (not shown in FIG. 1), persons skilled in the art can understand that the method implemented in the UE, the method implemented in the receiving BS, and the method implemented in the last severing BS can be separately implemented and incorporated in other apparatus with the like functions. The receiving BS may be a serving BS of the UE. The last serving BS may also be referred to as an anchor BS which keeps the UE context of the UE. In the embodiments of FIG. 5, the UE may be in a non RRC_CONNECTED state (e.g., a RRC_IDLE state or a RRC_INACTIVE state). Each of the receiving BS and the last serving BS may be referred to as a RAN node.

In the exemplary method shown in FIG. 5, steps 501-502 may be the same as steps 201-202 in FIG. 2.

After receiving the first retrieve UE context request message, the last serving BS may decide that anchor relocation is needed for the SDT. Then, in step 503, the last serving BS may transmit a retrieve UE context response message in response to the first retrieve UE context request message to the receiving BS. The retrieve UE context response message may include the full UE context of the UE.

That is, in the embodiment of FIG. 5, before downlink non-SDT data and/or signaling arrive, the anchor relocation procedure (e.g., the retrieve UE context procedure which includes steps 502 and 503) has been performed. That is, through the retrieve UE context procedure, the receiving BS has fetched the full UE context from the last serving BS. After the anchor relocation procedure, the receiving BS may also perform a path switch procedure. After the path switch procedure, the non-SDT data and/or signaling will arrive at the receiving BS directly.

Consequently, in step 504, at least one of the downlink non-SDT data from the UPF and downlink non-SDT signaling from the AMF for the UE may arrive at the receiving BS. That is, the receiving BS may receive at least one of the downlink non-SDT data from the UPF and downlink non-SDT signaling from the AMF.

In some embodiments of the present application, the arrival of downlink non-SDT data (i.e., receiving the downlink non-SDT data) from the UPF includes receiving data of non-SDT quality of QoS flow or data of non-SDT PDU session from the UPF during the SDT procedure. In such embodiments, the receiving BS may also receive an indication indicating whether the PDU session or the QoS flow is subject to a SDT or non-SDT data transmission during an establishment procedure of the PDU session or an establishment procedure of the QoS flow.

In some embodiments of the present application, the arrival of the downlink non-SDT signaling (i.e., receiving the downlink non-SDT signaling) from the AMF may include receiving a UE-associated signaling from the AMF during the SDT procedure.

Then, in step 505, in response to receiving at least one of the downlink non-SDT data from the UPF and downlink non-SDT signaling from the AMF, the receiving BS may transmit a RRC resume message to the UE for causing the UE to enter into the RRC_CONNECTED state. Then, after receiving the RRC resume message, in step 506, the UE may enter into the RRC_CONNECTED state for receiving the downlink non-SDT data and/or the downlink non-SDT signaling. For example, the UE may resume all non-SDT RBs of the downlink non-SDT data and/or the downlink non-SDT signaling.

According to some embodiments of the present application, the internal structure of a BS may be divided into a CU and at least one DU. The CU and the at least one DU are connected with each other by an interface F1 as specified in 3GPP standard documents. The RRC layer functionality, service data adaptation protocol (SDAP) functionality, and the PDCP layer functionality are included in the CU. The RLC layer functionality, medium access control (MAC) layer functionality, and the physical (PHY) layer functionality are included in each DU.

According to some embodiments of the present application, the CU may be separated into a CU-CP unit and at least one CU-UP unit. The CU-CP unit and each CU-UP unit may be connected with each other by an interface E1 as specified in 3GPP standard documents. The CU-CP unit and the DU are connected by an interface F1-C as specified in 3GPP documents. Each CU-UP unit and the at least one DU are connected by an interface F1-U as specified in 3GPP standard documents.

Figure 6:
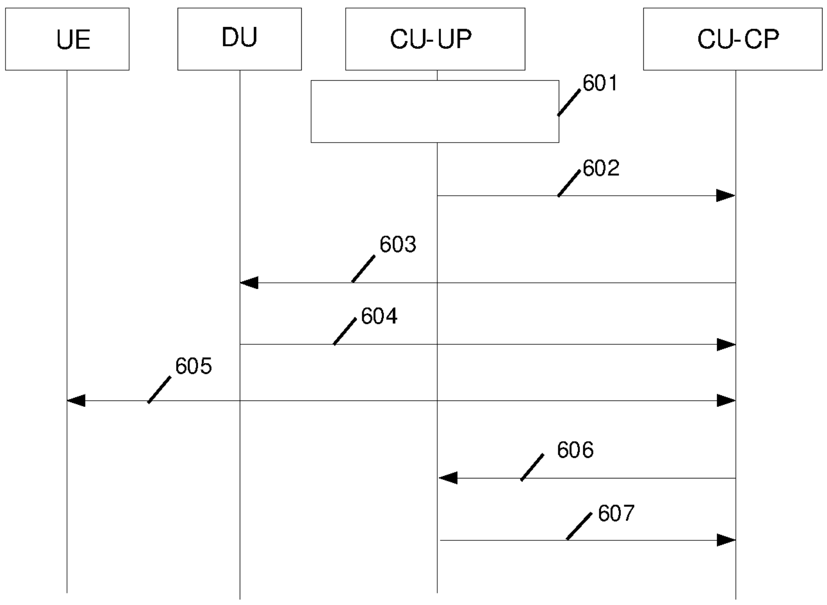
FIG. 6 illustrates yet another exemplary flowchart of a method for data and signaling transmission according to some other embodiments of the present application.

FIG. 6 illustrates yet another exemplary flowchart of a method for data and signaling transmission according to some embodiments of the present application. Although the method is illustrated in a system level by a UE (e.g., UE 102*a* or UE 102*b*), a DU of a BS (e.g., BS 101), a CU-CP of the BS, and a CU-UP of the BS, persons skilled in the art can understand that the method implemented in the UE, the method implemented in the DU, the method implemented in the CU-CP, and the method implemented in the CU-UP can be separately implemented and incorporated in other apparatus with the like functions. In the embodiments of FIG. 6, the UE may be in a non RRC_CONNECTED state (e.g., a RRC_IDLE state or a RRC_INACTIVE state). Each of the DU of the BS, the CU-CP of the BS, and the CU-UP of the BS may be referred to as a RAN node.

In the exemplary method shown in FIG. 6, in step 601, the CU-UP of a BS may detect downlink non-SDT data from the UPF on the next generation user plane (NG-U) tunnel(s). Then, in step 602, in response to the arrival of downlink non-SDT data, the CU-UP of the BS may transmit an indication associated with a downlink non-SDT transmission to the CU-CP of the BS.

In some embodiments of the present application, the indication associated with the downlink non-SDT transmission may indicate the arrival of the downlink non-SDT data. For example, the indication may be a DL non-SDT data arrival indication.

After receiving the indication, in step 603, the CU-CP may transmit a UE context modification request message to the DU. The UE context modification request message may include the indication associated a the downlink non-SDT transmission and the UE context of the non-SDT RB(s). In response to the UE context modification request message, in step 604, the DU may transmit a UE context modification response message to the CU-CP.

In step 605, in response to receiving the indication from the CU-UP, the CU-CP may transmit a RRC resume message to the UE for causing the UE to enter into the RRC_CONNECTED state. Then, after receiving the RRC resume message, the UE may enter into the RRC_CONNECTED state for receiving the downlink non-SDT data and/or the downlink non-SDT signaling. For example, the UE may resume all non-SDT RBs of the downlink non-SDT data and/or the downlink non-SDT signaling.

In step 606, the CU-CP may also transmit a bearer context modification request message to the CU-UP. The bearer context modification request message may include an indication indicating resuming the non-SDT RB(s) of the UE and the UE context of the non-SDT RB(s). In response to receiving the bearer context modification request message, in step 607, the CU-UP may transmit a bearer context modification response message to the CU-CP.

Through steps 603-604 and 606-607, both the DU and the CU-UP know the non-SDT RB(s) to be resumed, which may facilitate transmission the non-SDT data between the DU and the CU-UP.

According to some embodiments of the present application, a UE may initiate a SDT procedure for a SDT. Then, how to deal with a RAN paging message during the SDT procedure need to be addressed.

Figure 7:
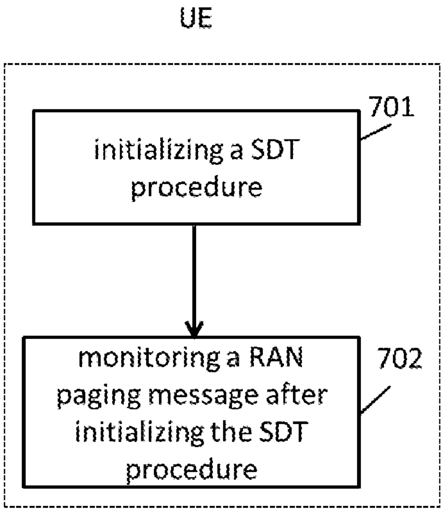
FIG. 7 illustrates a flow chart of a method for data and signaling transmission according to some embodiments of the present application.

FIG. 7 illustrates a flow chart of a method for data and signaling transmission according to some embodiments of the present application. The method in FIG. 7 may be performed by a UE (e.g., UE 102*a* or UE 102*b* in FIG. 1) in a RRC_INACTUVE state.

In the exemplary method shown in FIG. 7, in the case that the UE has small data to be transmitted, in step 701, the UE may initialize a SDT procedure associated with a SDT. In some embodiments of the present application, initializing a SDT procedure may refer to receiving the small data from upper layer(s), or selecting RACH based SDT or CG based SDT, or transmitting a first message in a RACH procedure (e.g., Msg1 in 4-step RACH scheme or MsgA in 2-step RACH scheme as specified in 3GPP standard documents), or transmitting the small SDT via CG based SDT. In some embodiments of the present application, initializing a SDT procedure may refer to transmitting a RRC resume request message associated with the SDT.

After initializing the SDT procedure, in step 702, the UE may monitor a RAN paging message from a receiving BS (e.g., BS 101 in FIG. 2).

According to some embodiments of the present application, the UE may receive a RAN paging message after initializing the SDT procedure, then the UE may transmit an indication indicating arrival of downlink non-SDT data to the receiving BS such that the receiving BS may indicate the UE to enter into the RRC_CONNECTED state by sending a RRC resume message to the UE.

According to some embodiments of the present application, the UE may receive a RAN paging message after initializing the SDT procedure, then the UE may start a timer in response to receiving the RAN paging message. The value of the timer may be configured by the network. In the case that no RRC resume message is received when the timer running, after the timer expires, the UE may initialize a RRC resume procedure in response to the RAN paging message, and then the UE may stop the timer. In the case that a RRC release message or a RRC reject message is received when the timer running, the UE may also initialize a RRC resume procedure and stop the timer in response to the RAN paging message.

According to some embodiments of the present application, when the UE initializes the SDT procedure, the UE may continue monitoring the RAN paging message until the SDT procedure is successful. That is, the UE may stop monitoring the RAN paging message in the case of the SDT procedure being successful. In an embodiment of the present application, the SDT procedure being successful may indicate that a RACH procedure is performed successfully in the case of the SDT being a RACH based SDT. In another embodiment of the present application, the SDT procedure being successful may indicate that a first packet of the small data is transmitted successfully. In another embodiment of the present application, the SDT procedure being successful may indicate that a RRC resume request message is transmitted successfully.

Figure 8:
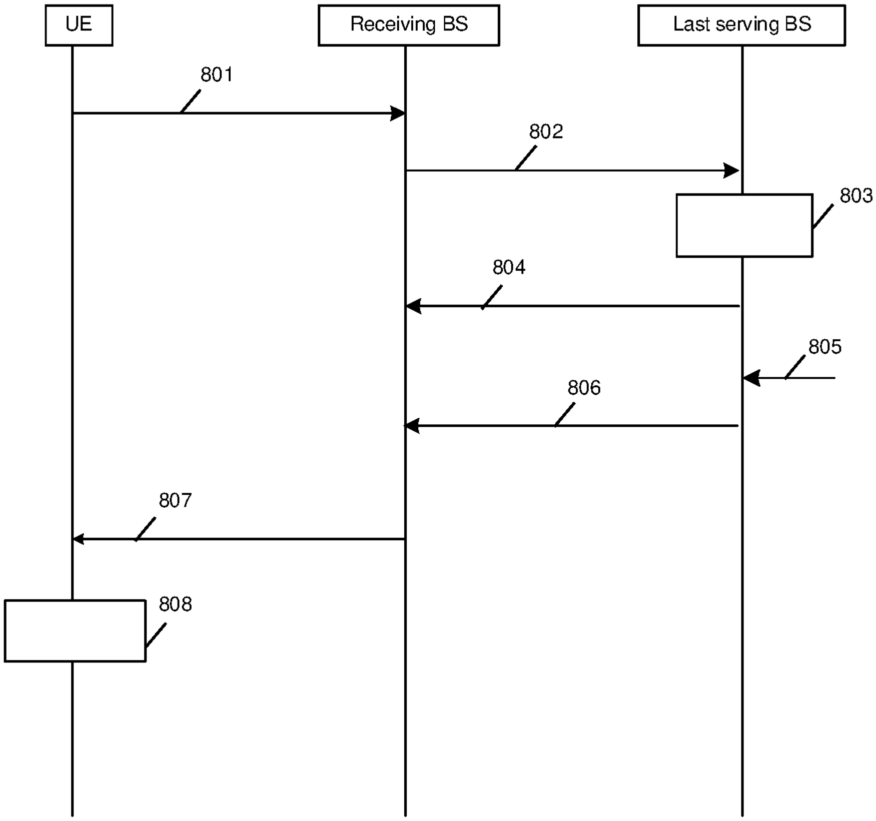
FIG. 8 illustrates an exemplary flowchart of a method for data and signaling transmission according to some embodiments of the present application.

FIG. 8 illustrates an exemplary flowchart of a method for data and signaling transmission according to some embodiments of the present application. Although the method is illustrated in a system level by a UE (e.g., UE 102*a* or UE 102*b* in FIG. 1), a receiving BS (e.g., BS 101), and a last serving BS (not shown in FIG. 1), persons skilled in the art can understand that the method implemented in the UE, the method implemented in the receiving BS, and the method implemented in the last severing BS can be separately implemented and incorporated in other apparatus with the like functions. The receiving BS may be a serving BS of the UE. The last serving BS may also be referred to as an anchor BS which keeps the UE context of the UE. In the embodiments of FIG. 8, the UE may be in a non RRC_CONNECTED state (e.g., a RRC_IDLE state or a RRC_INACTIVE state). Each of the receiving BS and the last serving BS may be referred to as a RAN node.

In the exemplary embodiments shown in FIG. 8, steps 801-805 may be the same as steps 201-205, respectively.

In step 806, in response to at least one of arrival of downlink non-SDT data and arrival of downlink non-SDT signaling, the last serving BS may end the SDT procedure, and transmit an indication associated with a downlink non-SDT transmission to the receiving BS. In some embodiments of the present application, the indication associated with the downlink non-SDT transmission may indicate at least one of arrival of the downlink non-SDT data and arrival of the downlink non-SDT signaling. For example, the indication may be a DL non-SDT data/signaling arrival indication.

In some embodiments of the present application, in response to at least one of arrival of downlink non-SDT data and arrival of downlink non-SDT signaling, the last serving BS may transmit a RRC release message with the indication associated with the downlink non-SDT transmission to the receiving BS. The indication associated with the downlink non-SDT transmission may be used as a cause value for indicating that the RRC release is caused by the at least one of arrival of the downlink non-SDT data and arrival of the downlink non-SDT signaling.

In an embodiment of the present application, another indication may be included in the RRC release message. The indication included in the RRC release message may indicate at least one of arrival of downlink non-SDT data and arrival of the downlink non-SDT signaling such that the UE can initialize another RRC resume procedure or a RRC setup procedure for the arrival of downlink non-SDT data and/or arrival of downlink non-SDT signaling. For example, the indication included in the RRC release message may be a DL non-SDT data/signaling arrival indication. Specifically, the indication may be used a cause value in the RRC release message.

After receiving the RRC release message with the indication associated with the downlink non-SDT transmission, in step 807, the receiving BS may transmit the RRC release message to the UE. After receiving the RRC release message, in step 808, the UE may end the SDT procedure. Since the RRC release message includes an indication indicating at least one of arrival of downlink non-SDT data and arrival of downlink non-SDT signaling, in step 808, the UE may initialize another RRC resume procedure or a RRC Release procedure for the at least one of arrival of the downlink non-SDT data and arrival of the downlink non-SDT signaling, e.g., the UE may transmit another RRC resume request message to the receiving BS or a RRC setup request message to the receiving BS.

Figure 9:
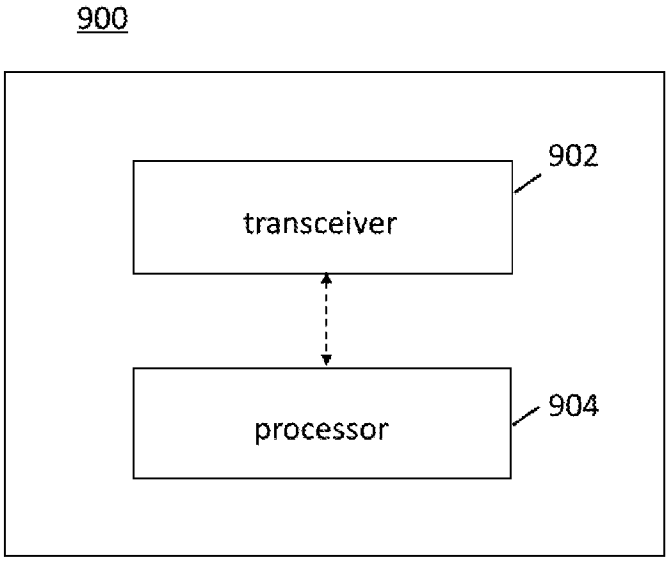
FIG. 9 illustrates a simplified block diagram of an apparatus for data and signaling transmission according to some embodiments of the present application.

FIG. 9 illustrates a simplified block diagram of an exemplary apparatus 900 for data and signaling transmission according to some embodiments of the present application. The apparatus 900 may include a UE (e.g., UE 102*a* or UE 102*b*) or a RAN node (e.g., a receiving BS, a last serving BS, the DU of a BS, the CU-CP of a BS, or the CU-UP of a BS).

Referring to FIG. 9, the apparatus 900 may include at least one processor 904 and at least one transceiver 902 coupled to the processor 904.

Although in this figure, elements such as the at least one transceiver 902 and processor 904 are described in the singular, the plural is contemplated unless a limitation to the singular is explicitly stated. In some embodiments of the present application, the transceiver 902 may be divided into two devices, such as a receiving circuitry and a transmitting circuitry. In some embodiments of the present application, the apparatus 900 may further include an input device, a memory, and/or other components.

In some embodiments of the present application, the apparatus 900 may be a RAN node (e.g., a receiving BS or CU-CP of a BS). The processor 904 may be configured to receive a RRC resume request message associated with a SDT from a UE, and to transmit a RRC resume message to indicate the UE to enter a RRC_CONNECTED state, in response to receiving at least one of the following: an indication associated with a downlink non-SDT transmission from another RAN node; downlink non-SDT data from a UPF; and downlink non-SDT signaling from a AMF.

In some embodiments of the present application, the apparatus 900 may be a RAN node (e.g., a receiving BS). The processor 904 may be configured to receive a RRC resume request message associated with a SDT from a UE that is in a non RRC_CONNECTED state; receive a RRC release message with an indication associated with a downlink non-SDT transmission from another RAN node; and transmit the RRC release message to the UE.

In some embodiments of the present application, the apparatus 900 may be a RAN node (e.g., a last serving BS). The processor 904 may be configured to receive a first retrieve UE context request message associated with a SDT of a UE, and to transmit an indication associated with a downlink non-SDT transmission in response to at least one of arrival of downlink non-SDT data and arrival of downlink non-SDT signaling.

In some embodiments of the present application, the apparatus 900 may be a UE. The processor 904 may be configured to initialize a SDT procedure for a SDT, and to monitor a RAN paging message after initializing the SDT procedure.

In some embodiments of the present application, the apparatus 900 may further include at least one non-transitory computer-readable medium. In some embodiments of the present disclosure, the non-transitory computer-readable medium may have stored thereon computer-executable instructions to cause a processor to implement the method with respect to a UE or a BS as described above. For example, the computer-executable instructions, when executed, cause the processor 904 interacting with transceiver 902, so as to perform operations of the methods, e.g., as described in view of any of FIGS. 2-8.

The method according to embodiments of the present application can also be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this application. For example, an embodiment of the present application provides an apparatus for data and signaling transmission, including a processor and a memory. Computer programmable instructions for implementing a method for data and signaling transmission are stored in the memory, and the processor is configured to perform the computer programmable instructions to implement the method for data and signaling transmission. The method may be a method as stated above or other method according to an embodiment of the present application.

An alternative embodiment preferably implements the methods according to embodiments of the present application in a non-transitory, computer-readable storage medium storing computer programmable instructions. The instructions are preferably executed by computer-executable components preferably integrated with a network security system. The non-transitory, computer-readable storage medium may be stored on any suitable computer readable media such as RAMs, ROMs, flash memory, EEPROMs, optical storage devices (CD or DVD), hard drives, floppy drives, or any suitable device. The computer-executable component is preferably a processor but the instructions may alternatively or additionally be executed by any suitable dedicated hardware device. For example, an embodiment of the present application provides a non-transitory, computer-readable storage medium having computer programmable instructions stored therein. The computer programmable instructions are configured to implement a method for MBS as stated above or other method according to an embodiment of the present application.

While this application has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skills in the art would be enabled to make and use the teachings of the application by simply employing the elements of the independent claims. Accordingly, embodiments of the application as set forth herein are intended to be illustrative, not limiting. Various changes may be made without departing from the spirit and scope of the application.

What is claimed is:

1. A method performed by a radio access network (RAN) node, the method comprising: receiving a radio resource control (RRC) resume request message associated with a small data transmission (SDT) from a user equipment (UE) that is in a non RRC_CONNECTED state;

maintaining the UE in the non RRC CONNECTED state for the SDT;

while the UE in the non RRC CONNECTED state receiving, from the UE, uplink small data associated with the SDT;

and transmitting a RRC resume message to the UE, the RRC resume message for causing the UE to enter into a RRC_CONNECTED state from the non RRC_CONNECTED state, in response to receiving at least one of the following: an indication associated with a downlink non-SDT transmission from another RAN node; downlink non-SDT data from a user plane function (UPF); and downlink non-SDT signaling from an access and mobility management function (AMF).

2. The method of claim 1, wherein receiving the downlink non-SDT data from the UPF includes receiving data of non-SDT quality of service (QoS) flow or data of a non-SDT protocol data unit (PDU) session from the UPF during a SDT procedure, and the method further comprises:

receiving an indication indicating whether the PDU session or the QoS flow is subject to a SDT or non-SDT data transmission during an establishment procedure of the PDU session or an establishment procedure of the QoS flow.

3. The method of claim 1, wherein the indication associated with the downlink non-SDT transmission from the other RAN node indicates at least one of arrival of the downlink non-SDT data and arrival of the downlink non-SDT signaling, and the method further comprises:

in response to receiving the indication, transmitting the RRC resume message to the UE to cause the UE to enter into the RRC_CONNECTED state for transmission of at least one of the downlink non-SDT data and the downlink non-SDT signaling.

4. The method of claim 1, wherein the indication associated with the downlink non-SDT transmission indicates that the UE is to enter into the RRC_CONNECTED state, and the method further comprises:

in response to receiving the indication, transmitting the RRC resume message to the UE to cause the UE to enter into the RRC_CONNECTED state for transmission of at least one of the downlink non-SDT data and the downlink non-SDT signaling.

5. The method of claim 1, wherein the indication associated with the downlink non-SDT transmission is a RAN paging message including an identity of the UE, and the method further comprises:

determining whether there is an ongoing SDT procedure for the UE; and if there is an ongoing SDT procedure for the UE, transmitting the RRC resume message to cause the UE to enter into the RRC_CONNECTED state for transmission of at least one of the downlink non-SDT data and the downlink non-SDT signaling.

6. A radio access network (RAN) node, comprising:

at least one memory; and at least one processor coupled with the at least one memory and configured to cause the RAN node to:

receive, from another RAN node, a first retrieve user equipment (UE) context request message associated with a small data transmission (SDT) of the UE that is in a non radio resource control (RRC)-CONNECTED state;

transmit, to the other RAN node, a retrieve UE context response message for the SDT;

forward, to the other RAN node, buffered downlink small data associated with the SDT; and in response to at least one of arrival of downlink non-SDT data and arrival of downlink non-SDT signaling, transmit an indication associated with a downlink non-SDT transmission to the other RAN node.

7. The RAN node of claim 6, wherein the arrival of downlink non-SDT data includes receiving data of non-SDT quality of service (QoS) flow or data of non-SDT protocol data unit (PDU) session from a user plane function (UPF) during a SDT procedure, and the at least one processor is configured to cause the RAN node to:

receive, from the other RAN node, an indication indicating whether the PDU session or the QoS flow is subject to a SDT or non-SDT data transmission during an establishment procedure of the PDU session or the QoS flow.

8. The RAN node of claim 6, wherein the indication associated with the downlink non-SDT transmission indicates at least one of arrival of downlink non-SDT data and arrival of downlink non-SDT signaling.

9. The RAN node of claim 6, wherein the indication associated with the downlink non-SDT transmission indicates that the UE is to enter into a RRC_CONNECTED state.

10. The RAN node of claim 6, wherein the at least one processor is configured to cause the RAN node to:

in response to at least one of arrival of downlink non-SDT data and arrival of downlink non-SDT signaling, transmit a RRC release message with the indication associated with the downlink non-SDT transmission.

11. A radio access network (RAN) node, comprising: at least one memory; and at least one processor coupled with the at least one memory and configured to cause the RAN node to: receive a radio resource control (RRC) resume request message associated with a small data transmission (SDT) from a user equipment (UE) that is in a non RRC_CONNECTED state; maintain the UE in the non RRC_CONNECTED state for the SDT;

while the UE in the non RRC CONNECTED state receive, from the UE, uplink small data associated with the SDT; and transmit a RRC resume message to the UE, the RRC resume message for causing the UE to enter into a RRC_CONNECTED state from the non RRC_CONNECTED state, in response to receiving at least one of the following: an indication associated with a downlink non-SDT transmission from another RAN node; downlink non-SDT data from a user plane function (UPF); and downlink non-SDT signaling from an access and mobility management function (AMF).

12. A user equipment (UE), comprising:

at least one memory; and at least one processor coupled with the at least one memory and configured to cause the UE to:

initialize a small data transmission (SDT) procedure for an SDT;

remain in a non radio resource control (RRC) CONNECTED state during the SDT procedure;

transmit, to a radio access network (RAN) node, uplink small data associated with the SDT; and monitor a RAN paging message associated with a downlink non-SDT transmission after initializing the SDT procedure.

13. The UE of claim 12, wherein the at least one processor is configured to cause the UE to stop monitoring the RAN paging message if the SDT procedure is successful.

14. The RAN node of claim 11, wherein the at least one processor is configured to cause the RAN node to receive the downlink non-SDT data from the UPF by receiving data of a non-SDT quality of service (QoS) flow or data of a non-SDT protocol data unit (PDU) session from the UPF during a SDT procedure, and the at least one processor is configured to cause the RAN node to:

receive an indication indicating whether the PDU session or the QoS flow is subject to a SDT or non-SDT data transmission during an establishment procedure of the PDU session or an establishment procedure of the QoS flow.

15. The RAN node of claim 11, wherein the indication associated with the downlink non-SDT transmission from the other RAN node indicates at least one of arrival of the downlink non-SDT data and arrival of the downlink non-SDT signaling, and the at least one processor is configured to cause the RAN node to:

in response to receiving the indication, transmit the RRC resume message to the UE to cause the UE to enter into the RRC_CONNECTED state for transmission of at least one of the downlink non-SDT data and the downlink non-SDT signaling.

16. The RAN node of claim 11, wherein the indication associated with the downlink non-SDT transmission indicates that the UE is to enter into the RRC_CONNECTED state, and the at least one processor is configured to cause the RAN node to:

in response to receiving the indication, transmit the RRC resume message to the UE to cause the UE to enter into the RRC_CONNECTED state for transmission of at least one of the downlink non-SDT data and the downlink non-SDT signaling.

17. The RAN node of claim 11, wherein the indication associated with the downlink non-SDT transmission is a RAN paging message including an identity of the UE, and the at least one processor is configured to cause the RAN node to:

determine whether there is an ongoing SDT procedure for the UE; and if there is an ongoing SDT procedure for the UE, transmit the RRC resume message to cause the UE to enter into the RRC_CONNECTED state for transmission of at least one of the downlink non-SDT data and the downlink non-SDT signaling.

* * * * *